Sept. 11, 1923.   1,467,927
R. N. DOERRES ET AL
ANTISKID CHAIN
Filed March 12, 1921
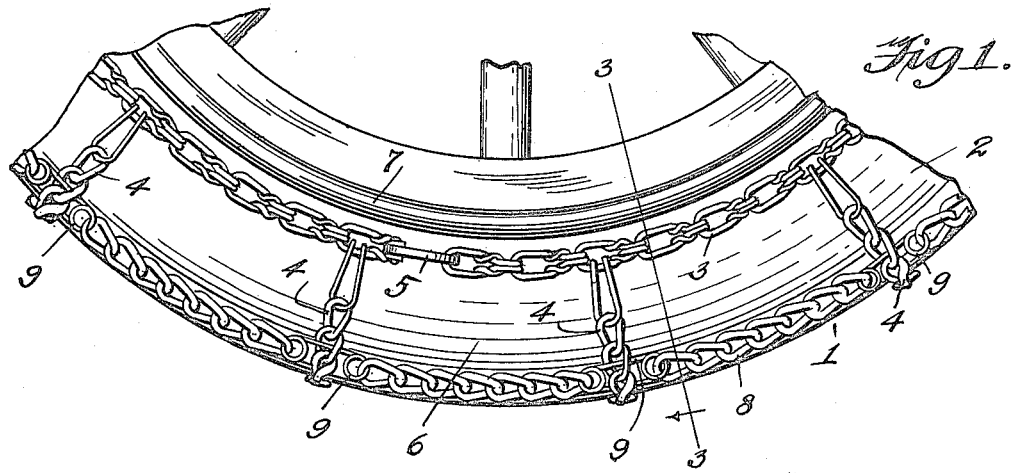
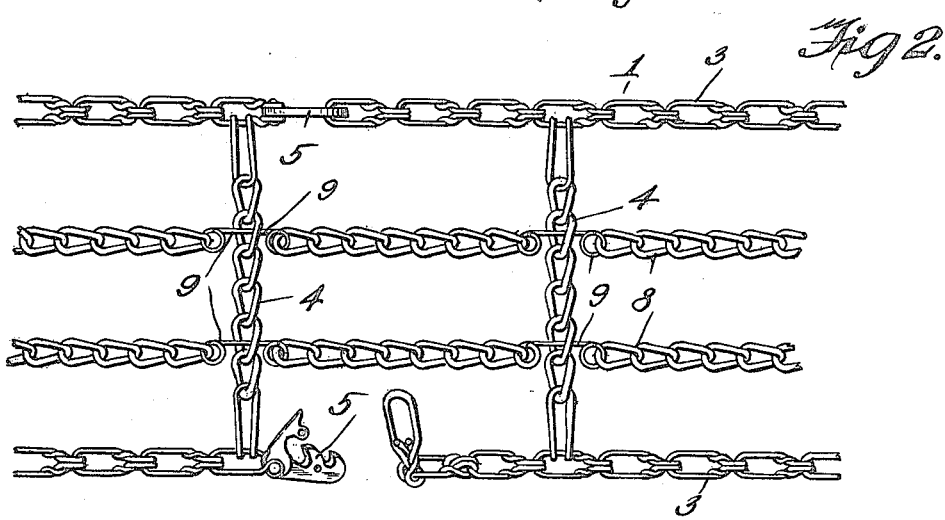
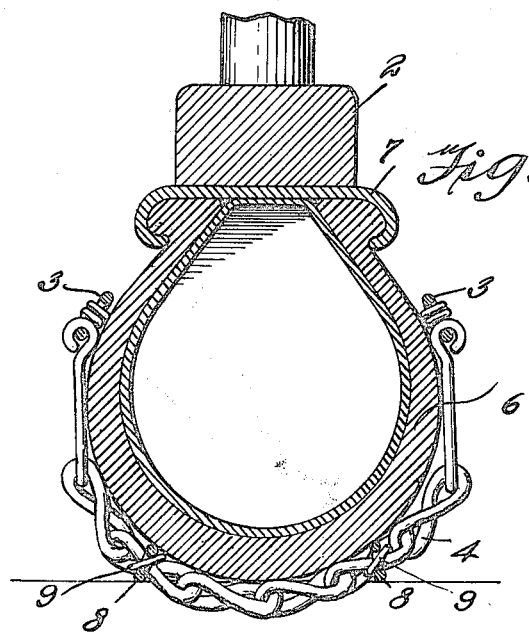
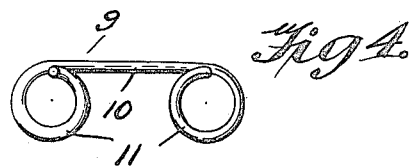
Inventor
Ralph N. Doerres
& Wade W. McGee
By C. C. Shepherd
Attorney Patented Sept. 11, 1923.

1,467,927

UNITED STATES PATENT OFFICE.

RALPH N. DOERRES AND WADE W. McGEE, OF CHILLICOTHE, OHIO.

ANTISKID CHAIN.

Application filed March 12, 1921. Serial No. 451,749.

*To all whom it may concern:*

Be it known that RALPH N. DOERRES and WADE W. McGEE, citizens of the United States, residing at Chillicothe, in the county of Ross and State of Ohio, have invented certain new and useful Improvements in Antiskid Chains, of which the following is a specification.

This invention relates broadly to improvments in anti-skid chains designed primarily for use in connection with the wheels of motor driven vehicles for the purpose of preventing undue lateral movement on the part of said vehicles and to increase the tractive grip between said wheels and the surfaces over which the same are operating.

The present invention provides an improved chain structure which differs mainly from the devices of the prior art by the inclusion of a pair of intermediately disposed, circumferentially extending tread chains, which are adapted to be situated between and to extend in parallelism with the usual side or attaching chains, the said tread chains being connected with the usual transversely extending cross chains, the construction of the chain being such that when applied to a vehicle wheel, the intermediate chains will lie immediately contiguous to the tread surfaces of said wheels, in order that said intermediate chains may serve to provide the wheels with a continuous structure for obtaining a tractive grip on the road surface and to prevent any lateral swerving or skidding on the part of the vehicle.

A further object of the invention resides in providing means whereby the tread chains may be connected with the transversely extending cross chains, said means being formed to include a plurality of links adapted to engage in certain links of the cross chains and to permit of relative movement therebetween, the said links terminating in twisted ends constituting eyes designed for connection with the links of the tread chains, the construction serving to permit the tread chains to be readily connected with the cross chains without involving a cumbersome and awkard construction and at the same time permits the said tread chains to extend completely around the tread of a vehicle tire so that a continuous road grip may be provided for said tire.

A still further object resides in forming the connecting links between the tread chains and the cross chains of a malleable material for the purpose of permitting of the convenient repair of the chain in event of damage thereto.

With these and other objects in view, as will appear as the description proceeds, the invention accordingly consists in the novel features of construction, combinations of elements and arrangements of parts, hereinafter to be fully described and to have the scope thereof pointed out in the appended claim.

In the accompanying drawing forming a part of this specification, and in which similar characters of reference denote like and corresponding parts:

Figure 1 is a side elevation of a portion of a vehicle wheel and disclosing the application thereto of the anti-skid chain structure forming the present invention.

Figure 2 is a plan view of the chain structure.

Figure 3 is a transverse sectional view taken along the line 3—3 of Figure 1.

Figure 4 is a detail view of one of the connecting links employed between the tread and cross chains.

Referring more particularly to the details of the invention, the numeral 1 designates the improved chain structure comprising the present invention in its entirety, the same being designed for use in connection with a vehicle wheel 2 for the purpose of improving the tractive grip between the wheel and the road surface over which the same may operate. The chain structure includes the usual circumferentially extending side chains 3, which are connected by the transversely extending cross chains 4, the latter having their end links connected in the ordinary manner with the links of the chains 3. The side chains 3 are provided with the usual fastening devices 5, which are adapted to operate in the customary manner for connecting the end links of the chains 3 together, when the chain structure as a whole is applied around the tire 6 of the wheel 2. It will be understood that the chains 3 are disposed to occupy their ordinary positions around or near the rim 7 of the wheel 2, and that the cross chains 4 will extend transversely around the tire 6 at spaced circumferential intervals. This construction is commonly employed in chain structures of this nature, and hence is not claimed per se, the purpose of the present invention being to improve this ordinary construction. It will be observed that the cross chains 4 are positioned at circumferential intervals around the tire 6, and thus the tractive grip afforded thereby is, of necessity, of an intermittent character and is in no sense continuous. Also, it frequently occurs that when the tread of the tire 6 is in engagement with the road surface, the vehicle will be permitted to laterally skid, since the cross chains are not always in effective position.

To overcome this objection and to provide a chain structure which will afford a constant and continuous grip in both linear and lateral directions, the invention includes intermediately disposed spaced circumferentially extending tread chains 8. These chains are situated between the side or fastening chains 3 and are located to extend in parallelism therewith. The said tread chains are secured in place in the chain assembly by connecting the same with the cross chains 4. This is accomplished by the presence of a plurality of connecting links 9 which are so formed as to be capable of uniting the tread chains with the cross chains without employing objectionable bulky connections which would have a tendency to cause excessive wear upon the outer surfaces of the tire 6, the said connecting links 9 serving, on the contrary, to permit the links of the chains 4 and 8 to flatly engage the surfaces of the tire 6 and in this manner to properly distribute and render uniform the wear on the tire caused by the use of the chain structure. The links 9 are preferably formed from stout wire, and include longitudinally extending intermediate portions 10, which are designed to pass through the links of the chains 4 at points where the latter are intersected by the circumferentially extending tread chains 8, and the portions 10 terminate, in turn, in eyes 11, which are spaced apart a distance sufficient to permit of circumferential movement of the chains 8 with respect to the cross chains 4. The eyes 11 are connected with the end links of the several sections constituting the chains 8, and by this construction the said tread chains are securely united with the cross chains. By forming the links 9 from wire, it will be apparent that it is possible to readily bend the same in order to release or connect the sections of the tread chains, thus permitting repairs to be conveniently made with but a minimum of expense and labor. Ordinarily it is not necessary to provide detachable links or other fasteners for the chains 8 such as are used in connecting the side chains 3, this feature being permitted in view of the fact that the diameter of the tread chains will be sufficient to permit the latter to be directly applied without adjustment around the tread of the tire 6.

When the chain is actively employed, the same is applied to the tire of the vehicle wheel by positioning the side and cross chains in the usual manner in effecting the securing of the chain structure to the wheel by means of the fastening devices 5. When this is accomplished the tread chains will be so positioned as to lie, as shown in Figure 3, immediately to each side of the road engaging portion of the tire 6 and to be so located that the said tread chains will provide means for constituting a continuous tractive device between the wheel and the road surface. This enables the wheel to secure a continuous grip upon the road surface, in contrast to the intermittent grip provided by the cross chains of ordinary construction, a feature which is particularly desirable when the wheel is being operated over surfaces affording but a slight tractive base. Also, it will be observed that by locating the tread chains in the manner stated and shown, the chains 8 will positively prevent lateral or skidding motion on the part of the wheel, since the chains 8 are constantly in engagement with the road surface and therefore are always effective in their operation.

What is claimed is:

In an anti-skid chain structure, a pair of circumferentially disposed side chains, cross chains extending transversely of and uniting said side chains, a plurality of circumferentially extending chain sections disposed between the side chains, links including longitudinal portions having terminal eyes for engaging the confronting end links of the chain sections, said longitudinal portions of the links passing through certain links of the cross chains and capable of lateral and longitudinal movement therein.

In testimony whereof we affix our signatures.

RALPH N. DOERRES.
WADE. W. McGEE.